US006351634B1

(12) United States Patent
Shin

(10) Patent No.: US 6,351,634 B1
(45) Date of Patent: Feb. 26, 2002

(54) MOBILE TELEPHONE AND METHOD FOR REGISTERING AND USING SPECIAL SYMBOLS AS A PASSWORD IN SAME

(75) Inventor: Jang-Ki Shin, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/324,422

(22) Filed: Jun. 1, 1999

(30) Foreign Application Priority Data

May 29, 1998 (KR) ............................................. 98-19821

(51) Int. Cl.⁷ ................................................. H04M 1/66
(52) U.S. Cl. ........................ 455/410; 455/411; 380/247
(58) Field of Search ................................ 455/410, 411, 455/418, 566, 575, 550; 345/156, 173, 179, 14, 17, 26; 379/93.19, 916, 903, 93.03; 380/247, 250

(56) References Cited

U.S. PATENT DOCUMENTS

| | | | |
|---|---|---|---|
| 5,545,857 A | * 8/1996 | Lee et al. ................. | 178/18.03 |
| 5,559,504 A | * 9/1996 | Itsumi et al. ............... | 340/5.53 |
| 5,646,649 A | * 7/1997 | Iwata et al. ................. | 345/173 |
| 5,959,260 A | * 9/1999 | Hoghooghi et al. ..... | 178/18.03 |
| 6,002,946 A | * 12/1999 | Reber et al. ................. | 455/557 |
| 6,088,585 A | * 7/2000 | Schmitt et al. ............. | 455/411 |

* cited by examiner

Primary Examiner—Dwayne Bost
Assistant Examiner—Erika A. Gary
(74) Attorney, Agent, or Firm—Dilworth & Barrese, LLP

(57) ABSTRACT

A mobile telephone is provided which includes a touch screen, character recognition means for recognizing data inputted via the touch screen, and a processing unit for receiving at least one secret symbol inputted via the touch screen while the mobile telephone is in a password registration mode. The processing unit providing the at least one secret symbol to the character recognition means for recognizing the at least one secret symbol and generating feature data corresponding thereto. The processing unit stores the feature data in a database to register the at least one secret symbol as a password. The processing unit further compares the stored feature data with feature data corresponding to data inputted via the touch screen for determining whether the inputted data is substantially similar to the at least one secret symbol while the telephone is in a password identification mode. A method is also provided for registering a secret symbol as a password. A method is further provided for identifying a secret symbol inputted via the touch screen as the correct password.

17 Claims, 3 Drawing Sheets

MOBILE TELEPHONE AND METHOD FOR REGISTERING AND USING SPECIAL SYMBOLS AS A PASSWORD IN SAME

PRIORITY

This application claims priority to an application entitled "Method For Registering and Using Special Symbols In Digital Mobile Telephone With Voice Recognition" filed in the Korean Industrial Property Office on May 29, 1998 and assigned Serial No. 98-19821, the contents of which are hereby incorporated by reference.

BACKGROUND OF THE INVENTION

1. Field of the Invention

The present invention relates to digital mobile telephones, and in particular to a mobile telephone and method for registering and using special symbols as a password in same. More particularly, the present invention relates to a mobile telephone and method for registering a secret symbol as a password, where the mobile telephone includes a character recognition function for recognizing alphanumeric characters and symbols inputted via a touch screen, to protect against unauthorized use of the mobile telephone.

2. Description of the Related Art

A conventional digital cellular mobile telephone is typically provided with a password registration function for registering a password to protect against an unauthorized user of the mobile telephone. Once an authorized user has registered a password, no one can make a phone call or use any particular function of the mobile telephone without inputting the registered password beforehand. For instance, a call locking function is generally incorporated in most mobile telephones for the purpose of protecting against unauthorized use. The call locking function provides a method for registering and identifying a password inputted by a potential user of the telephone and preventing use of the telephone if an incorrect password is inputted.

A typical or conventional password registration and identification function applicable in prior digital mobile telephones usually uses a password having a series of alphanumeric characters that are keyed-in by means of a key pad provided on an outside or front panel of the telephone. When the password is keyed-in on the key pad by a user, it may be inadvertently observed by a third person, such that the password becomes compromised. Further, such an alphanumeric password may be stolen by or revealed to a third person due to a limited amount of alphanumeric characters making up the password. Under these circumstances, such a conventional password registration and identification function would become useless as a means for providing security against unauthorized use of the mobile telephone and hence, the function fails to serve its originally intended purpose.

Furthermore, if the authorized user forgets the series of alphanumeric characters making up the password, or keys in an incorrect password using the key pad, then use of the mobile telephone by the authorized user is also prevented.

SUMMARY OF THE INVENTION

Therefore, it is an object of the present invention to provide a mobile telephone having a character recognition function for registering at least one secret symbol inputted via a touch screen as an effective password to protect against unauthorized use of the mobile telephone.

It is another object of the present invention to provide a method for registering and using a set of secret symbols in a digital mobile telephone having a character recognition function as a password, thereby protecting against unauthorized use and providing easy use of the mobile telephone.

It is still another object of the present invention to provide a method for registering and using a set of secret symbols as a password in a digital mobile telephone having a character recognition function capable of recognizing the secret symbols, for example, a signature of an authorized user or the user's predetermined hand-written characters, thereby protecting against a misuse of the telephone by unauthorized users.

Still, another object of the present invention is to provide a method of registering and using a password in a digital mobile telephone to guard against an authorized user from being unable to use the telephone due to forgetting the password or keying-in the wrong password.

To achieve the above objects, the present invention provides a mobile telephone having a touch screen, character recognition means for recognizing data inputted via the touch screen, and a processing unit for receiving at least one secret symbol inputted via the touch screen while the mobile telephone is in a password registration mode. The processing unit provides the at least one secret symbol to the character recognition means for recognizing the at least one secret symbol and generating feature data corresponding thereto. The processing unit further stores the feature data in a database to register the at least one secret symbol as a password. The processing unit compares the stored feature data with feature data corresponding to data inputted via the touch screen for determining whether the inputted data is substantially similar to the at least one secret symbol while the telephone is in a password identification mode.

The present invention further provides a method for registering a secret symbol as a password in a digital mobile telephone having a display, a touch screen, character recognition means, a secret symbol data base, and a central processing unit. The method includes the steps of placing the mobile telephone in a password registration mode; generating touch screen data upon application of pressure onto the touch screen while in the password registration mode to enter the secret symbol as the password; providing the character recognition means with the touch screen data; generating feature data corresponding to the touch screen data by driving the character recognition means; and storing the feature data into the secret symbol data base.

The touch screen data preferably includes coordinate data and status data. The coordinate data includes a series of X-axis and Y-axis coordinate values which correspond to pressure points on the touch screen which had pressure applied upon during entry of the secret symbol. The status data is used for determining an input character which was entered during entry of the secret symbol by analyzing the frequent application of pressure upon the pressure points.

Further, the feature data preferably includes coordinate data generated corresponding to the X- and Y-axis coordinates of the secret symbol; directional data corresponding to directions of movement in entering the secret symbol; and stroke data corresponding to a series of strokes defining the secret symbol.

Preferably, the secret symbol may include at least one character, one's signature, a numeral, or a combination thereof, which an authorized user of the mobile telephone intends to use as the password.

According to another aspect of the invention, a method is provided for identifying a secret symbol which has been registered as a password in a digital mobile telephone having a display, a touch screen, character recognition means, a secret symbol data base, and a central processing unit. The method includes the steps of placing the mobile telephone in a password identification mode; generating touch screen data and a password symbol message upon application of pressure onto the touch screen while in the password identification mode to enter at least one secret symbol as the password, the password symbol message providing a confirmation that the touch screen data includes the at least one secret symbol intended to be identified as the password; providing the character recognition means with the touch screen data and the password symbol message; generating feature data corresponding to the touch screen data by driving the character recognition means; comparing feature data stored within the secret symbol data base with the generated feature data and providing a resultant value; and placing the mobile telephone in a predetermined function service mode in accordance with the comparing step. The predetermined function service mode may include enabling a locking function to prevent use of at least one service provided by the mobile telephone.

DETAILED DESCRIPTION OF THE PREFERRED EMBODIMENTS

A preferred embodiment of the present invention will be described herein below with reference to the accompanying drawings. In the following description, well known functions or constructions are not described in detail since they would obscure the invention in unnecessary details.

The word "symbol" is defined herein as being any kind of input information entered via a touch screen of the mobile telephone described herein, such as a single character, a series of characters, an alphanumeric combination, a signature, a picture, etc.

Figure 1:
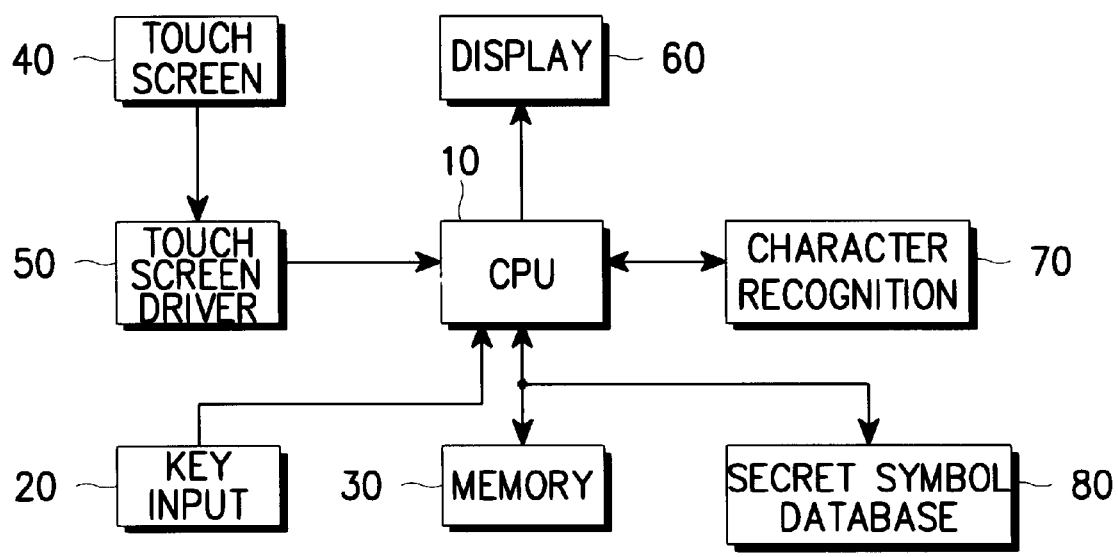
FIG. 1 is a block diagram illustrating the components of a digital mobile telephone having a character recognition function according to the present invention.

With reference to FIG. 1, there are shown the components of a digital mobile telephone having a character recognition function according to the present invention. A radio frequency (RF) section or a dual tone multi frequency (DTMF) section which constitutes a known part of the digital mobile phone is omitted for convenience in providing the following detailed description. A central processing unit (CPU) 10 controls the overall operation and various functions of the digital mobile telephone including the character recognition function. A key input component 20 is provided with a key pad having a plurality of alphanumeric keys and function keys for generating data corresponding to specific keyed-in information by a user of the phone. A touch screen 40 is used as an input device for character data. The touch screen 40 utilizes either a resistance plate system, as known in the art, which generates a coordinate value signal and a stroke number signal with respect to a given character based upon an alteration in current resistance, or a capacitor plate system, as known in the art, which generates a coordinate value signal and a stroke number signal with respect to a given character based upon an alteration in electric charge capacitance.

Outputs of the touch screen 40 include a set of X/Y coordinate value signals corresponding to each pressure point with respect to one or more characters applied thereon by a user, and a series of character stroke number values responsive to the existence of pressure applied onto the touch screen when inputting the characters. The output of X/Y coordinate value signals is generated responsive to pressure applied upon the pressure points during input of the character onto the touch screen 40. These signals are to be used as a resource for coordinate data with respect to X- and Y- axis according to alteration of position, while the stroke number values are to be used as a resource for status data for determining a number of strokes for each character according to the level of pressure applied onto the touch screen when inputting the characters thereon. The coordinate data and status data are provided to the CPU 10 through a touch screen driver 50, so that a character recognition with respect to a character input to the touch screen is carried out therein to determine which character has been inputted by the user. The data is processed and analysed by the CPU 10 and a character recognition device 70. The coordinate data and the status data will be collectively referred to herein as touch screen data.

The touch screen driver 50 is provided with at least one A/D converter for converting analog signals of coordinate data values and status data values outputted from the touch screen into digital signals, such that the touch screen data which includes the coordinate data and the status data is digital. The digital signals are then applied to the CPU 10 and further to the character recognition device 70. The character recognition device 70 operates to calculate and further correct coordinate data and stroke data with respect to the characters inputted onto the touch screen. The corrected coordinate data and stroke data outputted by the character recognition device 70 is referred collectively as feature data. The feature data represents the physical feature of the input characters inputted onto the touch screen.

As an example of the stroke data, consider for example, the user inputting a character "A" onto the touch screen 40. The character "A" needs to be analysed to determine how many strokes it is provided with to generate a correct feature data. If the character "A" was inputted using three strokes, a predetermined data format representing the "three strokes" can be used for the stroke data to relate to the character "A".

The character recognition device 70 is adapted to operate under the control of the CPU 10 and generates corresponding feature data by analysing and processing screen data received from the CPU. Further, the device 70 reads out a character code corresponding to the generated feature data, wherein the character code is stored in a character code storage area in the memory 30. The character code storage area includes a plurality of characters and their corresponding feature data, for example, in look-up table format.

According to the disclosed embodiment of the present invention, the character recognition device 70 is adapted to receive a password symbol message to enable the device 70 to recognize the received touch screen data as containing password registration information. Hence, the character recognition device 70 can discriminate between a message input pertaining to registration of a secret symbol as a password and usual data input which does not relate to password registration information. Therefore, if the received touch screen data contains the password symbol message, control is carried out to make a discrimination between a usual character recognition and a password symbol recognition.

The memory 30 includes a volatile memory (for example, RAM) and a non-volatile memory (for example, a flash memory or EEPROM) and stores therein a system control program to control all the general operations of the digital mobile phone; various initial service data; an operation program necessary for execution of a specific character recognition operation; and a series of various temporary data generated by the operation program. The memory 30 also includes a character code storage area to store therein a set of feasible combination of characters and their corresponding feature data as noted above. Further, the memory preferably may be assigned a password symbol storage area for storing the feature data corresponding to the secret symbol registered as the password according to the present invention.

A display device 60 is used to display a current status of the phone and various inputs inputted via the key input component 20 or via the touch screen 40 after such touch screen inputs have been recognized by the character recognition device 70. The display device 70 preferably includes a liquid crystal display (LCD) which is controlled by the CPU 10.

In a secret symbol data base (DB) 80 a series of a symbols are stored along with their corresponding feature data created by the character recognition device 70 when the symbols or individual characters are inputted via the touch screen. The feature data is used by the character recognition device 70 to identify the symbols and characters inputted. The feature data generally includes a set of data representing the original characteristics of a character or symbol inputted, coordinate data, stroke number data, and directional data indicative of the directional movements made for inputting the character or secret symbol via the touch screen 40.

Figure 2:
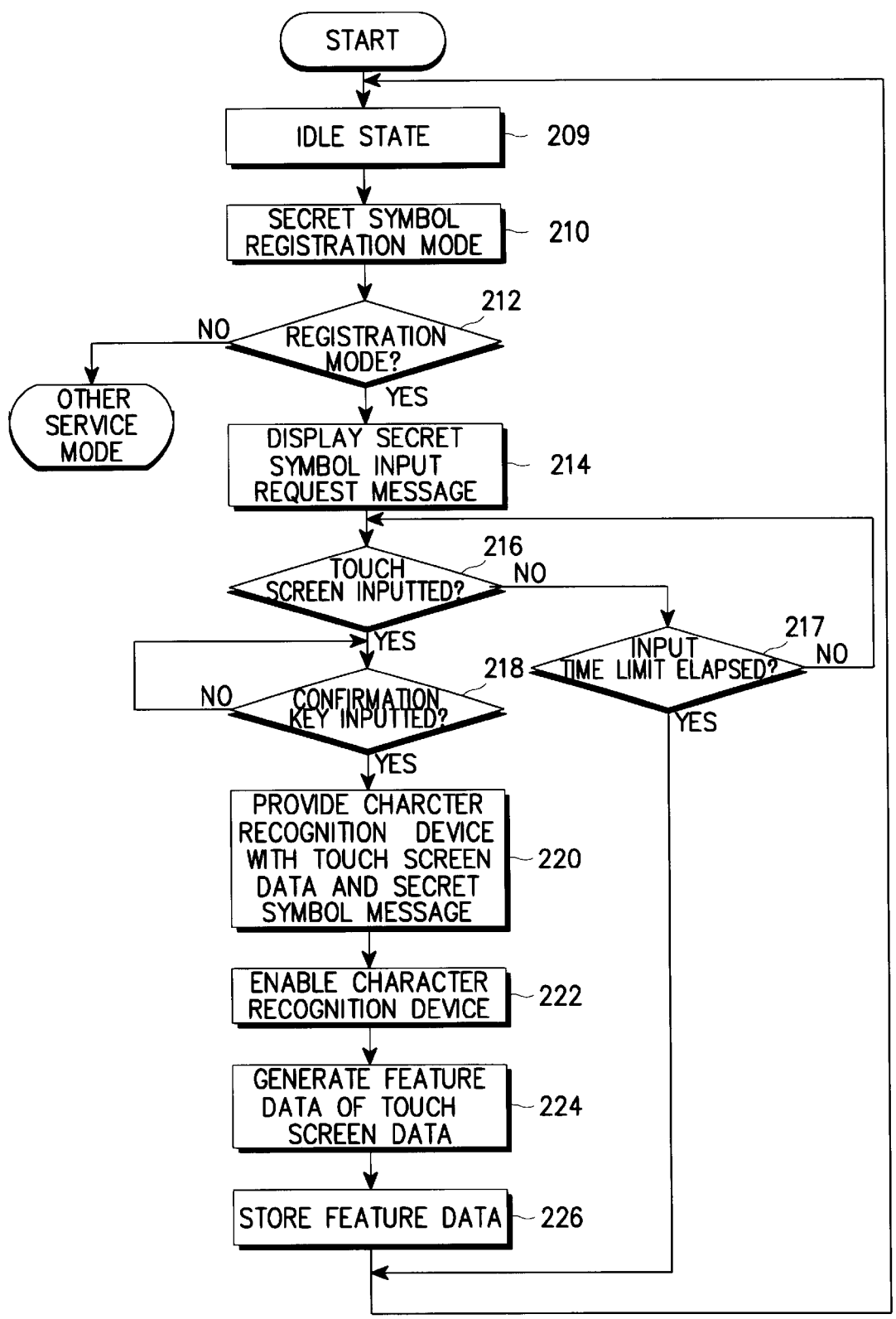
FIG. 2 is a flow chart illustrating a method of registering a secret symbol as a password for the mobile telephone of FIG. 1.

With reference to FIG. 2, a method for registering a secret symbol as a password for providing security to a user of the digital mobile telephone of FIG. 1 will be described. At first, at step 209, the mobile telephone is in an idle state. At step 210 the telephone is placed in a password or secret symbol registration mode by keying-in information via the key pad 20. At step 212, once the phone is in the secret symbol registration mode, control proceeds to step 214 where a message is displayed on the display 60 informing the user to input the password or secret symbol intended to be used as the password. Hence, the user will input via the touch screen 40 a desired secret symbol by using a pen or his finger in response to the above request. The secret symbol may be a usual character or his own preferred alphanumeric code or signature. In particular, it is noted that characters of any language may be used for the secret symbol, which is a main advantage of the present invention in providing security against unauthorized use.

At step 216, it is determined whether any input to the touch screen 40 has been received. If an input has been received via the touch screen, then the process proceeds to step 218 to determine whether a confirmation key input to complete the key input action by the user has been received. If it is determined that such a confirmation key has been inputted, then control proceeds to a step 220 in which the CPU 10 controls to provide the set of coordinate data and status data produced from the application of pressure onto the touch screen to the character recognition device 70, along with the touch screen data and a password symbol message informing that the touch screen data may be contain an input intended to be registered as the password or a secret symbol.

In response to the data received from the CPU 10, the character recognition device 70 begins operating in step 222 and generates feature data for the received touch screen data in step 224. The feature data is comprised of the X/Y coordinate data, stroke data corresponding to the secret symbol inputted via the touch screen 40, and directional data. The feature, coordinate and directional data represent the inherent characteristic of the inputted secret symbol. In step 226, the feature data generated by the character recognition device 70 is stored into the secret symbol data base 80 under the control of the CPU 10.

If it is determined in step 212 that the keyed-in information does not correspond with the password registration mode, then the appropriate function is performed by the control of the CPU 10 corresponding to the key-in information. Further, if it is determined in step 216 that an input via the touch screen has not been provided, then control proceeds to step 217 to determine whether a predetermined time limit for inputting the secret symbol has lapsed. If the predetermined time limit for inputting the secret symbol has not lapsed, control returns to step 216. If the predetermined time limit has lapsed, control returns to step 209 to place the mobile telephone in the idle state.

The aforementioned method for registering the secret symbol during a password registration mode will be explained hereunder in the viewpoint of the user of the mobile telephone. After the user presses the appropriate keys for registering the password, an information message requesting the user to enter a desired secret symbol is displayed on the display device 60 of the phone. The user then inputs the desired secret symbol to initiate registration thereof onto the touch screen 40 in response to the displayed information message. The user may use his fingers or a writing instrument, such as a pen or the like, as a means for inputting the desired secret symbol, such as his signature. After inputting the secret symbol, the character recognition device 70 is driven to recognize the inputted secret symbol and store feature data corresponding to the inputted secret symbol in the data base 80. The secret symbol registration procedure is then terminated.

Figure 3:
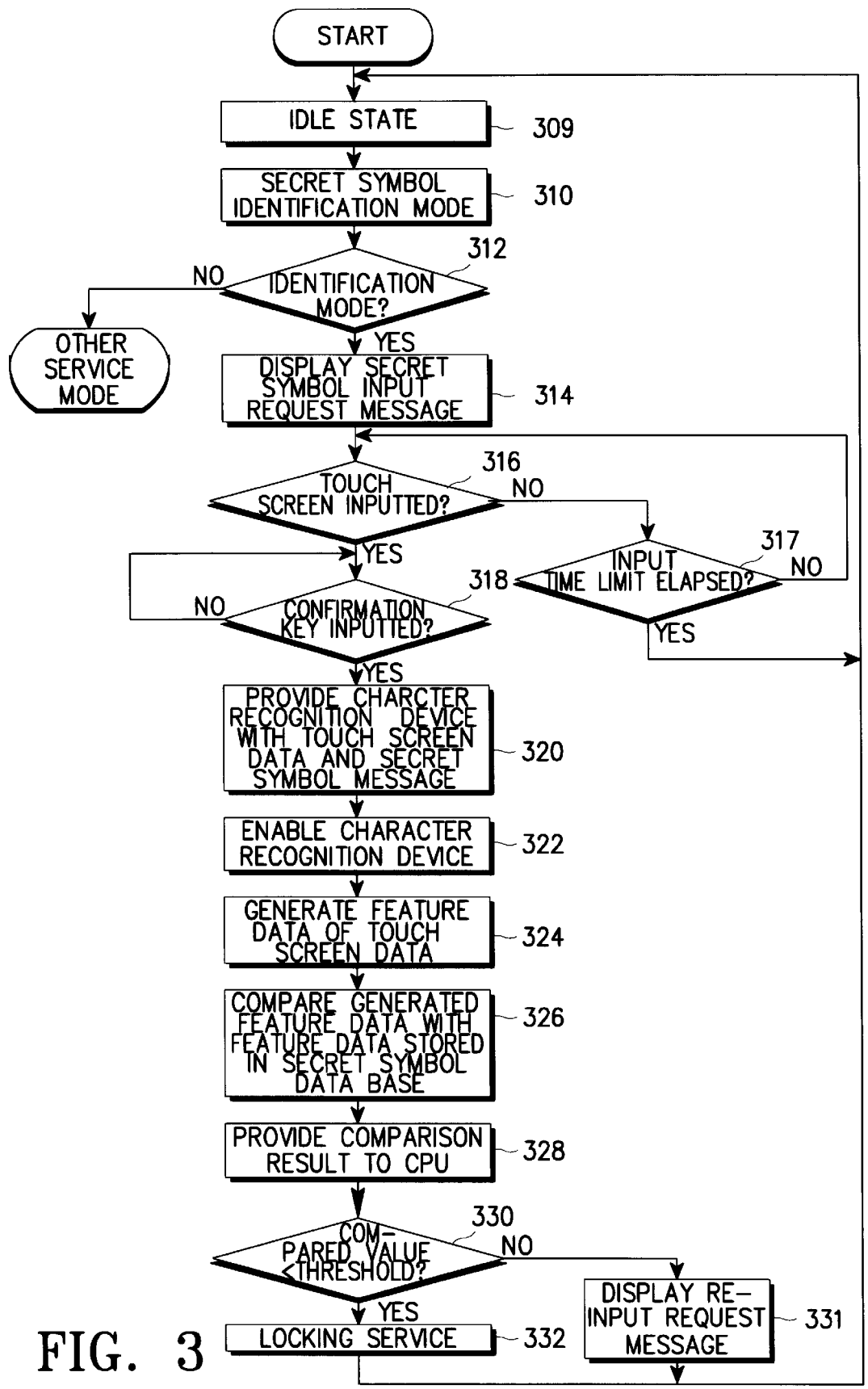
FIG. 3 is a flow chart illustrating a method of identifying a secret symbol as a proper password for the mobile telephone of FIG. 1.

With reference to FIG. 3, there is shown a flow chart for identifying the secret symbol according to the present invention. The method invokes a phone locking function and other functions cooperating with the locking function if the proper secret symbol is not identified. At step 309, the phone is in an idle state. At step 310, the phone is placed in a secret symbol identification mode by pressing an appropriate secret symbol identification key on the key pad 20. At step 312, the CPU 10 checks whether the appropriate key has been pressed for entering the identification mode and, if it is determined that the appropriate key has been pressed, then control proceeds to step 314. At step 314, an information message requesting the user to enter the secret symbol is displayed on the display device 60. Hence, the user inputs a secret symbol by using a writing instrument or a finger onto the touch screen 40 in response to the message request. The secret symbol may be a character, a signature, or an alphanumeric combination.

At step 316, it is determined whether the input to the touch screen 40 is responsive to the information message request, that is, whether an input has been received. If it is determined that an input has been received via the touch screen, then the process proceeds to step 318. At step 318, it is determined whether a confirmation key input to signal completion of entering the secret symbol has been received. If it is determined that the confirmation key input has been received, then control proceeds to step 320.

At step 320, the CPU 10, similarly to the process shown by FIG. 2, generates a set of coordinate data and status data according to the level of pressure applied to the touch screen 40 when writing the data thereon. The CPU 10 further controls the character recognition device 70 by providing the touch screen data and a password symbol message to the device 70 informing that the received touch screen data may be an input corresponding to the secret symbol. In response to this request from the CPU 10, the character recognition device 70 begins a recognition operation at step 322 and generates feature data for the received touch screen data in step 324. The feature data includes X- and Y-axis coordinate data and stroke data corresponding to the secret symbol inputted via the touch screen 40, and directional data, similarly to the secret symbol registration procedure shown by FIG. 2 and described above. The coordinate, stroke, and directional data will become the data representing the inherent characteristics of the secret symbol.

At step 326, the generated feature data is compared to feature data stored in the secret symbol data base 80 under the control of the CPU 10 to determine whether the secret symbol registered during the registration mode and the secret symbol inputted during the identification mode correspond to each other. At step 330, it is determined whether a resultant value generated from the above comparison step 326 is less than a predetermined threshold value. The comparison steps compensates for any physical errors due to handwriting the secret symbol by the user on the touch screen. Therefore, any characters which are slightly different during the handwriting step but within a given range of the threshold value could be regarded as being similar to characters of the secret symbol. At step 330, if it is determined that the resultant value is less than the predetermined threshold value or significantly different from the predetermined threshold value, then at step 332 a locking function is implemented to effectively lock the mobile telephone from being used.

However, if it is determined that the resultant value is not less than the pre-determined threshold value or not significantly different from the predetermined threshold value, then control proceeds to step 331 and a user information message requesting re-try of the secret symbol is displayed on the display device 60. The process then returns to step 309 to place the phone in the idle state for re-entry of the secret symbol.

If it is determined at step 316 that an input to the touch screen has not been received, then control proceeds to step 317 to determine whether a predetermined time limit for inputting a character has lapsed. If the time limit has not lapsed, then control returns to step 316. If the time limit has lapsed, control returns to step 309 and the phone is placed in the idle state.

According to the above description of the preferred embodiment of the present invention in conjunction with FIG. 3, a call locking function is initiated to prevent use of the phone at step 332. However, it is contemplated that in place of initiating a call locking function in the case where the wrong secret symbol has been inputted, any other special function or service may be initiated, such as limiting the number of services that could be used, for example, memory usage limitation, incoming/outgoing call limitation, international call limitation, memory erasure limitation or system initialization.

The aforementioned procedure identifying the secret symbol after placing the phone in the identification mode will be explained hereunder in the viewpoint of a user of the mobile phone. After the user has registered his secret symbol and attempts to use the phone to place a call, an information message request is displayed on the display device 60 informing the user to enter the secret symbol. The user then inputs the secret symbol onto the touch screen 40 in response to the information request message. After inputting the secret symbol, the character recognition device 70 is automatically driven to initiate a comparison operation to compare the feature data corresponding to the inputted secret symbol with the feature data stored in the data base 80 and corresponding to the pre-registered secret symbol according to the registration process illustrated by FIG. 2. According to the comparison result, the user is prevented from placing the call or from using several features of the phone, or is allowed to use all the features of the phone. The secret symbol identification procedure is then terminated.

According to the present invention, the secret symbol may include or be used with any type of handwritten characters, special symbols, numerals or any combination thereof, or the user's signature. The secret symbol may include characters in any language, provided that such a symbol could provide a certain degree of distinction during the comparison step with other symbols.

As apparent from the aforementioned description, the present invention provides a digital mobile telephone having a character recognition function and a touch screen for registering and using a secret symbol as a password. The present invention further provides a method of registering and using a secret symbol as an effective password for authorized use of the digital mobile telephone having the character recognition function, thereby providing more security and ease of use, i.e., a password does not have to be transmitted to a central monitoring station to determine whether the user is an authorized user of the phone. Further, the present invention provides a method of registering and identifying a set of secret symbols by using a character recognition function capable of recognizing a user's signature or a user's pre-determined handwritten characters, thereby preventing against unauthorized use of the phone and inconvenience to the user if the user forgets the password.

While the present invention has been described in detail with reference to the specific embodiments, they are mere exemplary applications. Thus, it is to be clearly understood that many variations can be made by anyone skilled in the art within the scope and spirit of the present invention as defined by the claims appended hereto.

What is claimed is:

1. A method for registering a secret symbol as a password in a digital mobile telephone having a display, a touch screen, character recognition means for recognizing data inputted via the touch screen, a secret symbol data base, and a central processing unit, the method comprises the steps of:

placing the mobile telephone in a password registration mode;

generating touch screen data upon application of pressure onto the touch screen while in the password registration mode to enter the secret symbol;

providing the character recognition means with the touch screen data;

generating feature data corresponding to the touch screen data by driving the character recognition means, wherein the feature data represents at least two physical features of the touch screen data;

and storing the feature data into the secret symbol data base.

2. The method according to claim 1, wherein the touch screen data comprises coordinate data and status data, the coordinate data includes a series of X-axis and Y-axis coordinate values corresponding to pressure points on the touch screen which had pressure applied upon during entry of the secret symbol, the status data including data relating to a number of strokes of the secret symbol.

3. The method according to claim 1, wherein the feature data comprises coordinate data corresponding to the X- and Y-axis coordinates of the secret symbol, directional data corresponding to directions of movement in entering the secret symbol, and stroke data corresponding to a series of strokes defining the secret symbol.

4. The method according to claim 1, wherein the secret symbol consists of one of at least one character, a signature, a numeral, a picture, and a combination thereof, which a user of the mobile telephone intends to use as the password.

5. The method according to claim 1, further comprising the step of placing the mobile telephone in an idle state if pressure has not been applied upon the touch screen after a predetermined time limit.

6. The method according to claim 1, wherein the step of providing the character recognition means with the touch screen data includes providing the character recognition means with a secret symbol message informing the character recognition means that said touch screen data includes data corresponding to a symbol intended to be registered as the secret symbol.

7. A method for identifying a secret symbol which has been registered as a password in a digital mobile telephone having a display, a touch screen, character recognition means for recognizing data inputted via the touch screen, a secret symbol data base, and a central processing unit, the method comprises the steps of:

placing the mobile telephone in a password identification mode;

generating touch screen data and a password symbol message upon application of pressure onto the touch screen while in the password identification mode to enter at least one secret symbol as the password, the password symbol message providing a confirmation that the touch screen data includes the at least one secret symbol intended to be identified as the password;

providing the character recognition means with the touch screen data and the password symbol message;

generating feature data corresponding to the touch screen data by driving the character recognition means, wherein the feature data represents at least two physical features of the touch screen data;

comparing feature data stored within the secret symbol data base with the generated feature data and providing a resultant value; and placing the mobile telephone in a predetermined function service mode in accordance with the comparing step.

8. The method according to claim 7, wherein the predetermined function service mode includes enabling a locking function to prevent use of at least one service provided by the mobile telephone.

9. The method according to claim 7, wherein the mobile telephone is placed in the predetermined function service mode if a difference between the resultant value and a predetermined threshold value is greater than a predetermined value.

10. The method according to claim 9, further comprising the step of displaying an information message on the display requesting re-entry of a secret symbol if the difference between the resultant value and the predetermined threshold value is greater than the predetermined value.

11. A method for registering and identifying a secret symbol as a password for use in a mobile telephone having a touch screen and character recognition means for recognizing data inputted via the touch screen, said method comprising the steps of:

processing a symbol character inputted via the touch screen by the character recognition means while the telephone is in a secret symbol registration mode;

storing feature data generated in said processing step in a memory, wherein the feature data represents at least two physical features of data inputted via the touch screen;

comparing the stored feature data with feature data corresponding to data inputted via the touch screen while the telephone is in a secret symbol identification mode; and performing at least one service function according to a result of the comparing step.

12. The method according to claim 11, wherein said secret symbol consists of one of at least one character, a signature, a numeral, a picture, and a combination thereof, which a user of the mobile telephone intends to use as the password.

13. The method according to claim 11, wherein the at least one service function includes enabling a locking function to prevent use of at least one service provided by the mobile telephone.

14. A mobile telephone comprising:

a touch screen;

character recognition means for recognizing data inputted via the touch screen; and a processing unit for receiving at least one secret symbol inputted via the touch screen while the mobile telephone is in a password registration mode, said processing unit providing said at least one secret symbol to the character recognition means for recognizing the at least one secret symbol and generating feature data corresponding thereto, the processing unit storing the feature data in a database to register the at least one secret symbol as a password, said processing unit further comparing the stored feature data with feature data corresponding to data inputted via the touch screen for determining whether the inputted data is substantially similar to the at least one secret symbol while said telephone is in a password identification mode, wherein the feature data represents at least two physical features of data inputted via the touch screen.

15. The mobile telephone according to claim 14, wherein said at least one secret symbol consists of at least one character, a signature, a numeral, a picture, and a combination thereof, which a user of the mobile telephone intends to use as the password.

16. The mobile telephone according to claim 14, wherein said processing unit initiates at least one service function based upon comparing the stored feature data with feature data corresponding to data inputted via the touch screen.

17. The mobile telephone according to claim 16, wherein said at least one service function includes enabling a locking function to prevent use of at least one service provided by the mobile telephone.

* * * * *